United States Patent [19]

Barwacz

[11] Patent Number: 5,140,829
[45] Date of Patent: Aug. 25, 1992

[54] AIR CONDITIONING SYSTEM

[76] Inventor: David Barwacz, 200 Shore Haven, SE., Grand Rapids, Mich. 49546

[21] Appl. No.: 730,670

[22] Filed: Jul. 16, 1991

[51] Int. Cl.⁵ .................. F25D 23/12; F25B 13/00
[52] U.S. Cl. ................................. 62/260; 62/238.7; 62/79; 62/502
[58] Field of Search ............ 62/238.1, 79, 96, 238.7, 62/502, 260

[56] References Cited

U.S. PATENT DOCUMENTS

| | | | |
|---|---|---|---|
| 2,148,969 | 2/1939 | Shipman | 62/79 |
| 2,860,493 | 11/1958 | Capps et al. | 62/238.1 |
| 4,070,870 | 1/1978 | Bahel et al. | 62/238.1 |
| 4,270,359 | 6/1981 | Hummel | 62/238.7 |
| 4,327,560 | 5/1982 | Leon et al. | 62/260 |
| 4,441,872 | 4/1984 | Seale | 417/282 |
| 4,545,214 | 10/1985 | Kinoshita | 62/160 |
| 4,718,248 | 1/1988 | Fisher | 62/238.7 |

Primary Examiner—Albert J. Makay
Assistant Examiner—William C. Doerrler
Attorney, Agent, or Firm—Waters & Morse

[57] ABSTRACT

A space-cooling system based upon the present invention cools the space through a heat exchanger carrying ground water that has been slightly chilled by a heat pump. The chiller can be referenced to the outflow water from the space heat exchanger, or to fresh ground water. The heated discharged water can be utilized as pre-heated household water, or discharged in irrigation or to a drainage system.

4 Claims, 2 Drawing Sheets

AIR CONDITIONING SYSTEM

BACKGROUND OF THE INVENTION

The most common system used for space cooling centers in the heat pump, which is based essentially on a refrigeration cycle involving the absorption of heat by the evaporation of a compressed refrigerant, followed by re-compressing the refrigerant and condensing it by transferring heat to a medium that may be convenient for disposal or heat utilization. The absorption phase can be adapted to cool the air directly with a heat exchanger, or cool some other medium to which the air is exposed. The condensation phase usually utilizes a heat exchanger that is cooled by a reference medium, such as outside air or ground water.

The efficiency of such a system is determined by comparing the space heat withdrawn, and the operating watts, giving the "energy efficiency ratio", or EER, commonly less than 14% for ground-water reference systems. A system referenced to outdoor air can be expected to operate under an EER of around 10%. A system in which space heat can be transferred directly to ground water (without a refrigeration cycle) can conceivably operate under an EER of 50 to 100, which is a tempting alternative. Here, the expended energy is primarily in the operation of circulation pumps.

Space-cooling systems should maintain humidity in the range of 40%-60%. Air out of the system and into the space should be at about 60° to be raised to around 78° when mixed with room air. Ground water in the northern Midwest can be expected to be at around 54°, and it is difficult to bring air down to 60° using direct transfer of heat to ground water exclusively. The temperature differential is too small for good heat transfer. These are the conditions providing the stimulus for the present invention.

SUMMARY OF THE INVENTION

The present invention provides a cooling system in which heat is removed from the space with ground water, or a ground water-referenced heat exchanger. The ground water, however, is subject to a cooling with a heat pump prior to entering the space-cooling exchanger. This is in contrast to the use of the ground water as a reference heat-disposal medium for a heat pump. A much higher EER is obtained in this way, along with other valuable options.

DESCRIPTION OF THE PREFERRED EMBODIMENT

Figure 1:
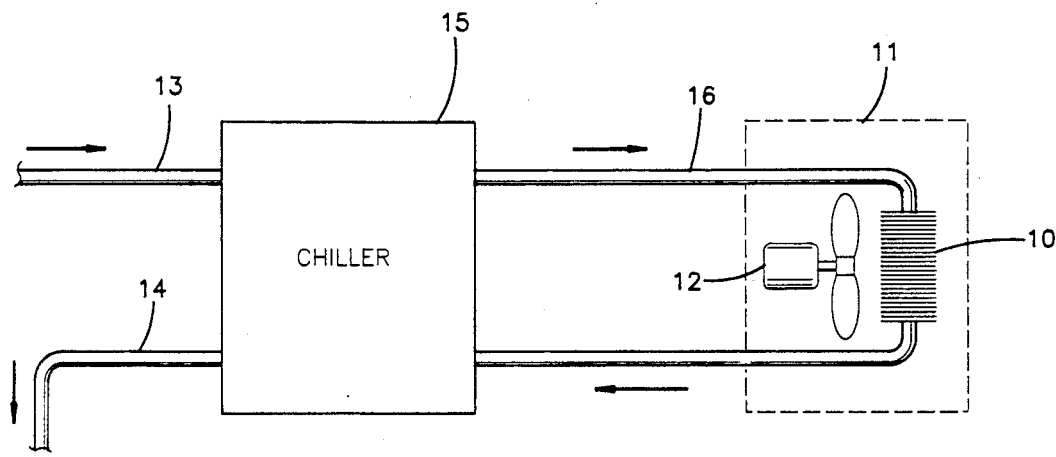
FIG. 1. is a schematic illustration showing the components of a system in which the condenser of the chiller is referenced to the outflow from the space heat exchanger.
Figure 2:
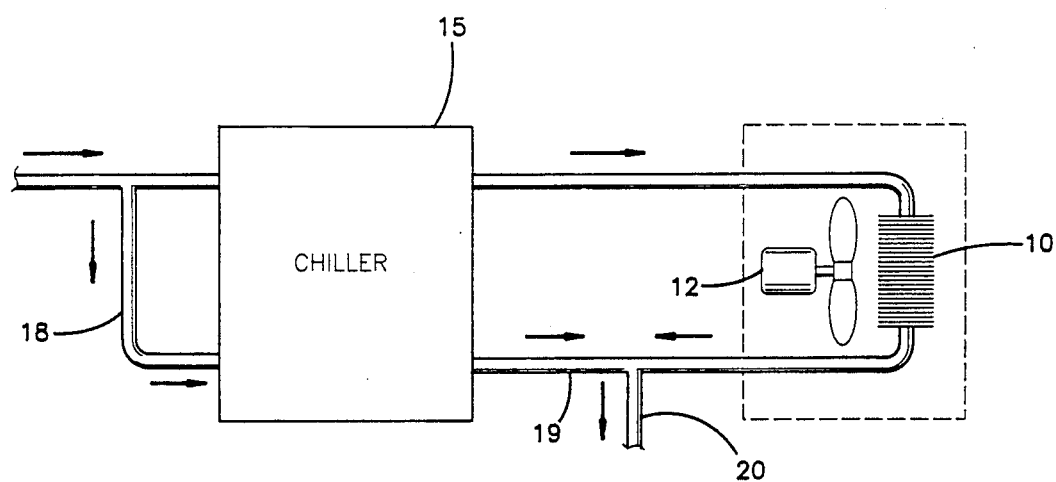
FIG. 2 is a schematic illustration in which the condenser of the chiller is referenced to fresh ground water.
Figure 3:
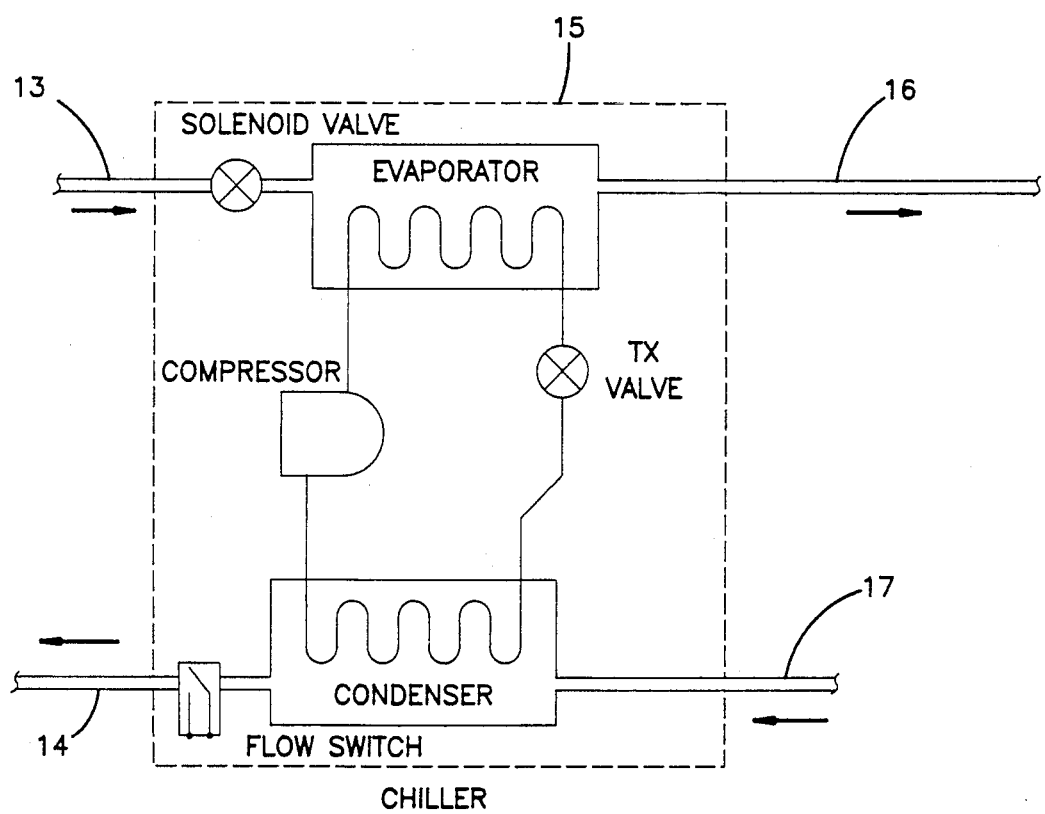
FIG. 3 is a schematic illustration showing the interior arrangement of the chiller in the FIG. 1 system.

Referring to FIG. 1, the heat exchanger 10 is shown installed in a space 11, with the fan 12 adapted to circulate air through the heat exchanger to cool the space 11. Ground water is supplied to the system through the pipe 13, and is returned for disposal or storage through the pipe 14. Prior to delivery of the inflow from the pipe 13 to the space heat exchanger 10, it passes through the chiller 15, which is constructed as shown in FIG. 3. After being cooled in the evaporator of the chiller, it is delivered to the space heat exchanger 10 through the pipe 16. This liquid is then returned in the pipe 17 to serve as a reference medium in the condenser of the chiller. In the refrigeration cycle, the compressor withdraws refrigerant from the evaporator, and compresses it. This compression induces a considerable elevation in temperature of the refrigerant, which is then delivered to the condenser. The water returning through the pipe 17 is still cool enough to liquefy the compressed refrigerant gas, which is then delivered back through the expansion valve to the evaporator to complete the cycle. In the FIG. 2 system, the condenser of the chiller is referenced to fresh ground water through the pipe 18, and this heated water is discharged through the pipe 19 and the disposal pipe 20, along with the output of the heat exchanger 10.

In a typical household system utilizing 54° ground water at the rate of four gallons per minute, this input would preferably be lowered by a chiller to about 48°, using a one ton refrigeration unit. A "ton" is considered as a cooling capacity of 12,000 btu/hour. This water is run through a fan coil such as is indicated at 10, 12. A term referred to as the "sensible heating ratio" (SHR) is defined as the amount of energy required to cool the air divided by the total energy removed from the air (including the latent heat of evaporation). The SHR associated with this example is about 0.79. The total cooling is 33,700 btu/hour with 1200 cfm air flow at an entry air temperature of 80DB/67WB. The output water from the space heat exchanger will be about 65°, which may be used to cool the heat pump condenser. This output water goes to approximately 73°, which can either be discharged, or used as pre-heated household hot water. It is estimated that pumping water out of the ground will consume energy at the rate of about 60 watts per gallon per minute. This gives 241 watts to operate a suitable pump delivering water to the pipe 13.

The action of the chiller results in an EER about four times that which the standard air conditioner-heat pump would provide with an outdoor air reference. A ground water reference heat pump in a conventional installation should give an EER of approximately 14, if the pump is reversed from the heating mode to provide a counterflow relationship. A standard rotary compressor actually works better under the conditions provided by the chiller, since a lower compression pressure may be used. The compressor's efficiency in this operation is nearly double the efficiency achievable in a standard air-to-air heat pump situation.

The pump plus the chiller in the example noted above requires approximately 910 watts, giving an EER of [33,700 divided by 910] 37. For comparison, a standard air-to-air (air referenced) air conditioner would give an EER of about 10%. With the inclusion of the energy of the cooling fan, the EER becomes 33,700 divided by the sum of 910 and 245, giving an EER of about 29%. This increase is in addition to the possibilities of using the output hot water, which is a considerable cost saving. If a well is already in place as a source of ground water, the cost of this system is less than any other air conditioning (cooling) system.

The installation of an off-on switch on the refrigeration system of the chiller makes it possible to switch to low-load, resulting in the direct cooling of the space heat exchanger with ground water, which may be usable under conditions of low humidity. Cooling directly with the ground water in this manner produces an EER of around 46, including the fan energy, or about 93 without the fan. The btu/hour is reduced to 22,400, and the SHR=1. The switch can be humidity-responsive, so that this mode of operation becomes automatic. The percentage of the time that the system can be operated under direct ground water cooling varies with the way the system happens to be used, although a running average would be that the "low" would be in use 30%-50% of the time in the area referred to.

The average person in the city spends about $200.00 per year for water used in lawn sprinkling, while this system requires approximately $25.00 a year to operate the water-circulation pump. With the discharge of this system going into the lawn sprinkling, there is an obvious economy. While a well is required, cities do not usually object to the drilling of wells for this purpose. The discharge of the system can also be diverted to a storm drain.

The system operates substantially better than conventional air-to-air heat pumps under the adverse conditions of high outside air temperature and/or high inside heat load.

With the conventional system under high outside temperatures, the efficiency is decreased because the heat pump must pump into a higher air temperature. The outside air also increased the inside heat load, due to the less than perfect insulation in most buildings.

With this system, the heat is pumped into the water, which at any reasonable well depth is unaffected by outdoor air conditions.

With regard to indoor heat load, a conventional system increases somewhat due to a decrease in the temperature difference between the evaporator and the condenser as indoor temperature goes up. With this system, the heat exchange coil (the equivalent of the evaporator) has a much smaller temperature sensitivity, due to the fact that a large portion of its cooling capacity is in the already cold ground water. This results in a substantial increase in btu/hour cooling capacity. For example, at 85°DB/71°WB indoor air conditions, the system increases btu/hour capacity by 22%. In comparison, a conventional system will increase by less than 10%.

I claim:

1. A space-cooling system comprising:
   a space heat exchanger, and means adapted to deliver ground water to said space heat exchanger; and
   heat-pump means to lower the temperature of said ground water prior to the entrance thereof into said space heat exchanger.

2. A system as defined in claim 1, wherein at least part of the waste heat from said heat pump means is delivered to a household hot water system.

3. A system as defined in claim 1, wherein at least part of the heated discharge from said heat pump means is delivered to an irrigation system.

4. A system as defined in claim 1, additionally including control means adapted to selectively activate said heat pump means.

* * * * *